(12) United States Patent
Hazu et al.

(10) Patent No.: US 11,939,504 B2
(45) Date of Patent: Mar. 26, 2024

(54) SCINTILLATOR AND RADIATION DETECTOR

(71) Applicants: Mitsubishi Chemical Corporation, Tokyo (JP); Tohoku University, Miyagi (JP)

(72) Inventors: Koji Hazu, Tokyo (JP); Kentaro Horibe, Tokyo (JP); Tetsuya Kawano, Tokyo (JP); Keiji Yamahara, Tokyo (JP); Shunsuke Kurosawa, Miyagi (JP); Akira Yoshikawa, Miyagi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 99 days.

(21) Appl. No.: 17/847,789

(22) Filed: Jun. 23, 2022

(65) Prior Publication Data

US 2022/0326400 A1 Oct. 13, 2022

Related U.S. Application Data

(63) Continuation of application No. PCT/JP2020/048520, filed on Dec. 24, 2020.

(30) Foreign Application Priority Data

Dec. 25, 2019 (JP) .................................. 2019-234577

(51) Int. Cl.
*C09K 11/77* (2006.01)
*C09K 11/55* (2006.01)
*G01T 1/202* (2006.01)

(52) U.S. Cl.
CPC .......... *C09K 11/7715* (2013.01); *C09K 11/55* (2013.01); *G01T 1/2023* (2013.01)

(58) Field of Classification Search
CPC .... C09K 11/7715; C09K 11/55; G01T 1/2023
See application file for complete search history.

(56) References Cited

U.S. PATENT DOCUMENTS

| 5,786,600 A | 7/1998 | Lambert et al. |
| 2003/0193040 A1 | 10/2003 | Venkataramani et al. |

(Continued)

FOREIGN PATENT DOCUMENTS

| JP | 2010-235388 A | 10/2010 |
| JP | 5674385 B2 | 2/2015 |

(Continued)

OTHER PUBLICATIONS

Shimura et al. (Zr doped GSO:Ce single crystals and their scintillation performance, IEEE Symposium Conference Record Nuclear Science 2004 . . . vol. 5. IEEE, 2004.) (Year: 2004).*

(Continued)

*Primary Examiner* — Hugh Maupin
(74) *Attorney, Agent, or Firm* — Morgan, Lewis & Bockius LLP

(57) ABSTRACT

The present invention aims to provide a scintillator which has a short fluorescence decay time, whose fluorescence intensity after a period of time following radiation irradiation is low, and which shows largely improved light-transmittance. A scintillator represented by the following General Formula (1), the scintillator including Zr, having a Zr content of not less than 1500 ppm by mass therein, and being a block of a sintered body. $Q_xM_yO_{3z}:A$ ... (1) (wherein in General Formula (1), Q includes at least one or more kinds of divalent metallic elements; M includes at least Hf; and x, y, and z independently satisfy $0.5 \leq x \leq 1.5$, $0.5 \leq y \leq 1.5$, and $0.7 \leq z \leq 1.5$, respectively).

17 Claims, 4 Drawing Sheets

(56) References Cited

U.S. PATENT DOCUMENTS

2010/0327227 A1 12/2010 Kurata et al.
2018/0321393 A1* 11/2018 Wu .................. C01G 25/006

FOREIGN PATENT DOCUMENTS

| JP | 2015-151535 A | 8/2015 |
| JP | 2016-056378 A | 4/2016 |

OTHER PUBLICATIONS

Extended European Search Report issued in corresponding European Patent Application No. 20906000.3 dated Dec. 20, 2022.
Van Loef et al., "Scintillation Properties of SrHfO3:Ce3+ and BaHfO3:Ce3+ Ceramics," IEEE Transactions on Nuclear Science, 54(3): 741-743 (2007).
Grezer et al., "BaHfO3:Ce sintered ceramic scintillators," Radiation Measurements, 45: 386-388 (2010).
Nakauchi et al., "Scintillation properties of Ti- and Zr-doped lanthanum hafnate single crystals," Optical Materials, 90: 227-230 (2019).
Fukushima et al., "Photoluminescence and scintillation properties of Ti-doped CaHfO3 crystals," Japanese Journal of Applied Physics, 58: 052005 (2019).
Nakauchi et al., "Sintillation properties of RE2Hf2O7(RE= La,Gd,Lu) single crystals prepared by xenon arc floating zone furnace," Japanese Journal of Applied Physics, 57: 100307 (2018).
Pilania et al., "Role of Multiple Charge States of Ce in the Scintillation of ABO3 Perovskites," Physical Review Applied, 10: 024026 (2018).
International Search Report issued in corresponding International Patent Application No. PCT/JP2020/048520 dated Mar. 2, 2021.
International Preliminary Report on Patentability and Written Opinion issued in corresponding International Patent Application No. PCT/JP2020/048520 dated Jul. 7, 2022.

* cited by examiner

SCINTILLATOR AND RADIATION DETECTOR

CROSS-REFERENCE TO RELATED APPLICATION

This is a continuation of International Application PCT/JP2020/048520, filed on Dec. 24, 2020, and designated the U.S., and claims priority from Japanese Patent Application 2019-234577 which was filed on Dec. 25, 2019, the entire contents of which are incorporated herein by reference.

TECHNICAL FIELD

The present invention relates to a scintillator for use in a high-count radiation detector such as a positron emission tomography (PET) apparatus, which scintillator is used for a scintillation detector for a radiation such as gamma ray.

BACKGROUND ART

Known representative examples of scintillators for detection of radiation include $Lu_2SiO_5$, $Ga_3Al_5O_{12}$, and $Gd_2Si_2O_7$. In the research and development in this field, improvement of scintillator properties has been attempted based on the structures of these compounds using, for example, a method in which a base atom is replaced with an atom of the same group, or a method in which co-doping with an impurity atom having a valence different from that of the luminescence center atom is carried out (Patent Documents 1 to 3).

Silicon photomultipliers have been widely used in recent years, and scintillators having a short fluorescence decay time (DT) are demanded from the viewpoint of improvement of the spatial resolution on the basis of the time resolution. For example, it has been reported that, by the use of a lutetium orthosilicate scintillator doped with Ce, a DT of about 30 to 40 ns can be achieved (Patent Document 2).

Further, hafnate scintillators such as $SrHfO_3$ and $BaHfO_3$ have been reported as scintillators showing even shorter DTs (Non-patent Documents 1 and 2).

PRIOR ART DOCUMENTS

Patent Documents

[Patent Document 1] JP 5674385 B
[Patent Document 2] JP 2016-56378 A
[Patent Document 3] JP 2015-151535 A

Non-Patent Documents

[Non-patent Document 1] Scintillation Properties of SrHfO3:Ce3+ and BaHfO3:Ce3+ Ceramics, E. V. van Loef, W. M. Higgins, J. Glodo, C. Brecher, A. Lempicki, V. Venkataramani, W. W. Moses, S. E. Derenzo, and K. S. Shah, IEEE Transactions on Nuclear Science, 54 741-743 (2007) [Non-patent Document 2] BaHfO3: Ce sintered ceramic scintillators, A. Grezer, E. Zych, and L. Lepinski, Radiation Measurements 45, 386-388 (2010)

SUMMARY OF THE INVENTION

Problems to be Solved by the Invention

In the hafnate scintillators that have been conventionally reported, the fluorescence decay time is short, but there are problems, for example, that a plurality of components may affect the decay curve, leading to a high fluorescence intensity remaining after a period of time following radiation irradiation (Non-patent Document 1), and that the light-transmittance is extremely low due to scattering caused by a low degree of sintering (Non-patent Document 2). There is also a problem that, since a highly pure Hf raw material is used as a raw material, the scintillators are very expensive.

Thus, an object to be achieved by the present invention is to provide a scintillator which has a short fluorescence decay time, whose fluorescence intensity after a period of time following radiation irradiation is low, and which shows largely improved light-transmittance. Another object to be achieved by the present invention is to provide a production method by which a scintillator can be inexpensively produced while achieving the above object.

Means for Solving the Problems

According to the present invention, as a result of intensive study in view of the problems described above, the present inventors discovered that the problems can be solved by the use of a scintillator containing an appropriate amount of Zr, thereby completing the present invention.

More specifically, the outline of the present invention includes the following.

[1] A scintillator represented by the following General Formula (1), the scintillator comprising Zr, having a Zr content of not less than 1500 ppm by mass therein, and being a block of a sintered body.

$$Q_xM_yO_{3z} \qquad (1)$$

wherein in General Formula (1), Q includes at least one or more kinds of divalent metallic elements; M includes at least Hf; and x, y, and z independently satisfy $0.5 \leq x \leq 1.5$, $0.5 \leq y \leq 1.5$, and $0.7 \leq z \leq 1.5$, respectively.

[2] The scintillator according to [1], wherein the Zr content is not more than 21,000 ppm by mass.

[3] The scintillator according to [2], wherein the Zr content is not more than 5000 ppm by mass.

[4] The scintillator according to any one of [1] to [3], wherein the divalent metallic element(s) include(s) one or more kinds of elements selected from the group consisting of Ba, Sr, and Ca.

[5] The scintillator according to any one of [1] to [4], further comprising one or more kinds of elements selected from the group consisting of Ce, Pr, Nd, Eu, Tb, and Yb as an activator(s).

[6] The scintillator according to any one of [1] to [5], having a columnar shape, flat plate shape, or curved plate shape, and having a height of not less than 1 mm.

[7] The scintillator according to any one of [1] to [6], having a fluorescence decay time of not more than 30 ns.

[8] The scintillator according to any one of [1] to [7], wherein the fluorescence decay time is not more than 20 ns.

[9] The scintillator according to any one of [1] to [8], wherein the linear transmittance of light having a wavelength of 390 nm at a thickness of 1.6 mm is not less than 1%.

[10] The scintillator according to any one of [1] to [9], wherein the linear transmittance of light having a wavelength of 800 nm at a thickness of 1.6 mm is not less than 5%.

[11] The scintillator according to any one of [1] to [10], wherein, upon irradiation with γ-ray, the fluorescence intensity 100 ns after the time when the fluorescence intensity reaches the maximum value is not more than 2% with respect to the maximum value of fluorescence intensity, which is taken as 100%.

[12] A radiation detector comprising the scintillator according to any one of [1] to [11].

[13] A radiation inspection apparatus comprising a radiation detector,
the radiation detector comprising the scintillator according to any one of [1] to [11].

[14] A method of producing a scintillator, the method comprising:
a raw material mixing step of mixing raw materials to obtain a raw material mixture; and
a synthesis step of subjecting the raw material mixture to heat treatment to obtain a synthetic powder;
the raw materials comprising at least $HfO_2$ having a purity of not more than 99.0 mol %,
the scintillator being a scintillator represented by the following General Formula (1), comprising Zr, having a Zr content of not less than 1500 ppm by mass therein, and being a block of a sintered body.

$$Q_xM_yO_{3z} \tag{1}$$

wherein in General Formula (1), Q includes at least one or more kinds of divalent metallic elements; M includes at least Hf; and x, y, and z independently satisfy $0.5 \le x \le 1.5$, $0.5 \le y \le 1.5$, and $0.7 \le z \le 1.5$, respectively.

[15] The method of producing a scintillator according to [14], wherein the Zr content in the $HfO_2$ is not less than 1500 ppm by mass.

[16] The method of producing a scintillator according to [14] or [15], further comprising:
a pressure molding step of pressure-molding the synthetic powder to obtain a pressure-molded body; and
a firing step of firing the pressure-molded body to obtain a fired product.

[17] The method of producing a scintillator according to [14] or [15], comprising:
a pressure molding step of pressure-molding the synthetic powder to obtain a pressure-molded body;
a firing step of firing the pressure-molded body to obtain a fired product; and
an annealing step of annealing the fired product after the firing step.

Effect of the Invention

The present invention can provide a scintillator which has a short fluorescence decay time, whose fluorescence intensity after a period of time following radiation irradiation is low, and which shows largely improved light-transmittance. Further, the present invention can provide a scintillator having these effects, which scintillator can be inexpensively produced.

MODE FOR CARRYING OUT THE INVENTION

Figure 1:
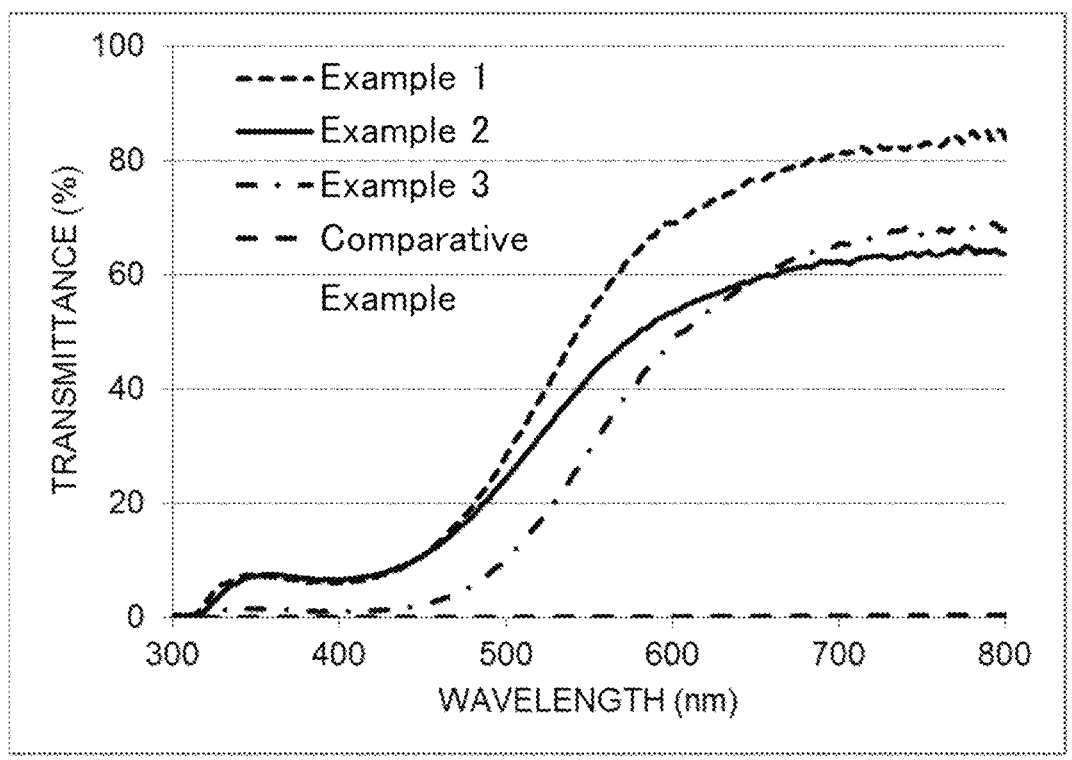
FIG. 1 is a diagram illustrating linear transmittance curves of the scintillators of Examples 1 to 3 and Comparative Example 1.

Embodiments of the present invention are described below in detail. These descriptions are examples (representative examples) of embodiments of the present invention, and the present invention is not limited by those contents as long as the spirit of the present invention is not spoiled.

In the present description, the numerical range expressed using " . . . to . . . " means the range including the values described before and after "to" as the lower limit and the upper limit, respectively. Thus, "A to B" means a value(s) of not less than A and not more than B.

<Scintillator>

A scintillator as one embodiment of the present invention (which may also be hereinafter simply referred to as "scintillator") is a scintillator represented by the following General Formula (1), the scintillator comprising Zr, having a Zr content of not less than 1500 by mass therein, and being a block of a sintered body.

$$Q_xM_yO_{3z} \tag{1}$$

(wherein in General Formula (1), Q includes at least one or more kinds of divalent metallic elements; M includes at least Hf; and x, y, and z independently satisfy $0.5 \le x \le 1.5$, $0.5 \le y \le 1.5$, and $0.7 \le z \le 1.5$, respectively.)

Q in General Formula (1) includes at least one or more kinds of divalent metallic elements. From the viewpoint of obtaining a short fluorescence decay time, and from the viewpoint of improving the fluorescence intensity after radiation irradiation and light-transmittance, the scintillator preferably comprises an alkaline earth metal element, more preferably comprises at least one or more selected from the group consisting of Ba, Sr, and Ca. Q may include one of these elements alone, or may include two or more thereof in an arbitrary combination at arbitrary ratios. Q especially preferably includes Ba from the viewpoint of obtaining a short fluorescence decay time.

The total ratio of divalent metallic elements in the total of Q is not limited. From the viewpoint of maintaining an optimal charge balance, the ratio is usually not less than 20 mol %, preferably not less than 30 mol %, more preferably not less than 40 mol %, still more preferably not less than 50 mol %. There is no upper limit, and the ratio is usually not more than 100 mol %.

In cases where Q comprises one or more selected from the group consisting of Ba, Ca, and Sr, the total ratio of Ba, Ca, and Sr in the total of Q is usually not less than 10 mol %, preferably not less than 20 mol %, more preferably not less than 30 mol %, still more preferably not less than 40 mol %, most preferably not less than 50 mol %. Regarding the upper limit, the ratio is not more than 100 mol %. The ratio of each of Ba, Ca, and Sr is not limited. Within the range in which the total of their ratios does not exceed the above-described total ratio, each ratio is usually independently not less than 0.001 mol % and not more than 100 mol % with respect to the above-described total ratio. Only one of Ba, Ca, and Sr may be used; two or more of these may be used as major components at arbitrary ratios; or one or two of these may be used as a major component(s), and a small amount of another/other element(s) may be added like an activator(s). By appropriate inclusion of each element, the fluorescence decay time can be preferably adjusted.

M in General Formula (1) is not limited as long as it includes at least Hf from the viewpoint of reduction of the fluorescence decay time, and improvement of the fluorescence intensity after radiation irradiation and light-transmittance.

The ratio of Hf in the total of M is not limited. The ratio is usually not less than 10 mol %, preferably not less than 20 mol %, more preferably not less than 30 mol %, still more preferably not less than 40 mol %. Regarding the upper limit, the ratio is not more than 100%. In cases where M includes Hf at a sufficient ratio, a high effective nuclear charge can be achieved, so that a scintillator having a high radiation stopping power can be obtained.

The scintillator represented by General Formula (1) comprises Zr as an element other than Q, M, and O from the viewpoint of reduction of the fluorescence decay time, and improvement of the fluorescence intensity after radiation irradiation and light-transmittance.

Zr may be present in any mode in the scintillator. For example, similarly to the later-described activator, Zr may be included in one of Q and M, or may be included in both of Q and M.

In cases where the Zr content in the scintillator is not less than 1500 ppm by mass, the reduction of the fluorescence decay time, and the improvement of the fluorescence intensity after radiation irradiation and light-transmittance can be achieved. Further, the Zr content in the scintillator is preferably not less than 2000 ppm by mass, more preferably not less than 3000 ppm by mass, still more preferably not less than 4000 ppm by mass. Regarding the upper limit, the Zr content is usually not more than 21,000 ppm by mass, preferably not more than 18,000 ppm by mass, more preferably not more than 15,000 ppm by mass, still more preferably not more than 12,000 ppm by mass, especially preferably not more than 8000 ppm by mass, most preferably not more than 5000 ppm by mass. In cases where the Zr content is not less than the lower limit, a scintillator having a good afterglow property and good light-transmittance can be easily obtained. Further, in cases where the Zr content is not more than the upper limit, the afterglow intensity derived from Zr is not too high, and an appropriate afterglow property can be obtained The Zr content can be adjusted by controlling the amount of Zr (or a Zr compound) that may be added as a raw material. In cases where Zr is contained as an impurity in a raw material other than the Zr (or the Zr compound), the content may be adjusted by selecting the raw material from the viewpoint of the impurity content, or by combination of the selection of the amount of the Zr (or the Zr compound) added and the selection of the raw material.

The Zr content in the scintillator is not necessarily the same as the content in the total raw materials blended, and may be concentrated or may decrease during the production process. Nevertheless, as described later in Examples, the Zr content in the scintillator reflects the Zr content in the total raw materials to be blended, so that it increases or decreases in accordance with the Zr content in the total raw materials blended. A scintillator comprising Zr within a preferred range can be obtained by appropriately controlling the raw material ratio, the ratio of each element upon the blending of the raw materials, addition of a Zr compound, and conditions in the production method.

As shown in the following General Formula (2), the scintillator represented by General Formula (1) may comprise another element A (also referred to as "activator element A") as an activator other than Q, M, O, and Zr. For example, the scintillator may comprise one or more selected from the group consisting of Ce, Pr, Nd, Eu, Tb, and Yb.

From the viewpoint of obtaining a short fluorescence decay time, the scintillator preferably comprises Ce.

$$Q_xM_yO_{3z}:A \quad (2)$$

The conditions for Q, M, x, y, and z in the General Formula (2) are the same as in the General Formula (1).

The activator element A may be present in any mode in the scintillator. For example, the activator element A may be included in one of Q and M, or may be included in both of Q and M.

The content of the activator element A is not limited. For example, the content of the activator element A with respect to the total of the scintillator is usually not more than 1.0% by mass, more preferably not more than 0.5% by mass, still more preferably not more than 0.2% by mass, or may be not more than 0.1% by mass. The lower limit is not limited. For example, in cases where the other element A is included in Q, the content of the activator element A with respect to the total of Q is usually not less than 0.01 mol % and not more than 5 mol %, preferably not less than 0.1 mol % and not more than 2 mol %. In cases where the other element A is included in M, the content of the activator element A with respect to the total of M is usually not less than 0.001 mol %, and usually not more than 5 mol %, preferably not more than 1 mol %, more preferably not more than 0.1 mol %. The content is preferably as low as possible. By inclusion of an appropriate amount of the element as an activator, a higher fluorescence intensity can be obtained.

The scintillator represented by General Formula (1) may comprise Al as an element other than the various elements described above. The Al content in the scintillator is usually not more than 1500 ppm by mass, preferably not more than 1200 ppm by mass, more preferably not more than 1000 ppm by mass, still more preferably not more than 800 ppm by mass, not more than 500 ppm by mass, not more than 200 ppm by mass, or not more than 100 ppm by mass. There is no lower limit of the Al content, and Al does not necessarily need to be included. However, from the viewpoint of the fact that it may be included as an impurity, the Al content is usually not less than 1 ppm by mass. In cases where the Al content is within the above-described range, a scintillator showing good light-transmittance can be obtained.

Al may be present in any mode in the scintillator. For example, similarly to the above-described activator, Al may be included in one of Q and M, or may be included in both of Q and M.

In cases where the Al content in the scintillator is too high, the light emission property tends to be deteriorated, and a preferred light-transmittance tends not to be obtained in the sintered body.

The Al content can be adjusted by controlling the amount of Al (or an Al compound) that may be added as a raw material. In cases where Al is contained as an impurity in a raw material other than the Al (or the Al compound), the content may be adjusted by controlling the purity of the raw material, or by combination of the selection of the amount of the Al (or the Al compound) added and the selection of the raw material, or by reducing the Al content by a common method for removing impurities.

Since contamination with Al may occur from a device or an apparatus, or from the ambient environment during the production, the adjustment to a preferred Al content may also be carried out, for example, by avoiding use of a device or an apparatus that may contain Al or that was used for treating Al, or by avoiding an environment that may cause the contamination with Al, or by arbitrary combination of these, in the production process.

The scintillator represented by General Formula (1) may contain Mg as an element other than the various elements described above. The Mg content in the scintillator is not more than 100 ppm by mass, preferably not more than 90 ppm by mass, more preferably not more than 80 ppm by mass, still more preferably not more than 60 ppm by mass, not more than 40 ppm by mass, not more than 20 ppm by mass, or not more than 10 ppm by mass. There is no lower limit of the Mg content, and Mg does not necessarily need to be included. However, from the viewpoint of the fact that it may be included as an impurity, the Mg content is usually not less than 1 ppm by mass. In cases where the Mg content is within the above-described range, a scintillator showing good light-transmittance can be obtained.

Mg may be present in any mode in the scintillator. For example, similarly to the above-described activator, Mg may be included in one of Q and M, or may be included in both of Q and M.

In cases where the Mg content in the scintillator is too high, the light emission property tends to be deteriorated, and a preferred light-transmittance tends not to be obtained in the sintered body.

The Mg content can be adjusted by controlling the amount of Mg (or a Mg compound) that may be added as a raw material. In cases where Mg is contained as an impurity in a raw material other than the Mg (or the Mg compound), the content may be adjusted by controlling the purity of the raw material, or by combination of the selection of the amount of the Mg (or the Mg compound) added and the selection of the raw material, or by reducing the Mg content by a common method for removing impurities.

Since contamination with Mg may occur from a device or an apparatus, or from the ambient environment during the production, the adjustment to a preferred Mg content may also be carried out, for example, by avoiding use of a device or an apparatus that may contain Mg or that was used for treating Mg, or by avoiding an environment that may cause the contamination with Mg, or by arbitrary combination of these, in the production process.

From the viewpoint of reduction of the fluorescence decay time, and improvement of the fluorescence intensity after radiation irradiation and light-transmittance, x in General Formula (1) satisfies $0.5 \leq x \leq 1.5$. x preferably satisfies $0.7 \leq x$, more preferably satisfies $0.9 \leq x$, and preferably satisfies $x \leq 1.3$, more preferably satisfies $x \leq 1.1$.

From the viewpoint of reduction of the fluorescence decay time, and improvement of the fluorescence intensity after radiation irradiation and light-transmittance, y in General Formula (1) satisfies $0.5 \leq y \leq 1.5$. y preferably satisfies $0.7 \leq y$, more preferably satisfies $0.8 \leq y$, and preferably satisfies $y \leq 1.3$, more preferably satisfies $y \leq 1.1$.

From the viewpoint of reduction of the fluorescence decay time, and improvement of the fluorescence intensity after radiation irradiation and light-transmittance, z in General Formula (1) satisfies $0.7 \leq z \leq 1.5$. z preferably satisfies $0.8 \leq z$, more preferably satisfies $0.9 \leq z$, and preferably satisfies $z \leq 1.4$, more preferably satisfies $z \leq 1.3$.

The scintillator represented by General Formula (1) may also contain another element as long as the effect of the present invention is not deteriorated.

The method of analyzing the elements contained in the scintillator is not limited. The analysis may be carried out by, for example, the total element analysis method described in Examples below using glow-discharge mass spectrometry (GDMS).

The fluorescence decay time of the scintillator is not limited. It may be measured by the same method under the same conditions as in the measurement of the fluorescence decay time in the Examples below. As measured by this method, the fluorescence decay time of the scintillator is usually not more than 30 ns, preferably not more than 20 ns, more preferably not more than 17 ns, still more preferably not more than 15 ns.

The linear transmittance of light having a wavelength of 390 nm in the scintillator is not limited. It is usually not less than 1%, preferably not less than 5%, and is preferably not more than 7%, more preferably not more than 6.5%. The linear transmittance of light having a wavelength of 800 nm is not limited. It is usually not less than 5%, preferably not less than 40%, more preferably not less than 50%.

The linear transmittance of light (which may also be simply referred to as "light transmittance") may be measured by the method described in the Examples below.

The preferred range of transmittance described above is preferably satisfied when, for example, the thickness of the scintillator is 1.6 mm. In cases where the thickness of the scintillator exceeds 1.6 mm, the scintillator is processed such that the thickness of the scintillator is decreased to 1.6 mm, to prepare a subject whose light transmittance is to be measured. In cases where the thickness of the scintillator is below 1.6 mm, pieces of the scintillator are layered on each other such that the thickness of the scintillator is not less than 1.6 mm, and then the scintillator is processed such that the thickness is decreased to 1.6 mm, to prepare a subject whose light transmittance is to be measured. The processing may be carried out by a known method capable of decreasing the thickness of the scintillator. For example, a dicer may be used to carry out a cutting process to achieve a slightly larger thickness than the target thickness. In such a case, the scintillator after the cutting is subjected to a grinding process using a grinder. By carrying out the process while gradually changing the particle size of the grindstone used for the grinding process, the scintillator can be processed to have a flat surface hardly showing irregularity.

The scintillator is preferably capable of being excited by irradiation with ionizing radiation to cause light emission within the wavelength range of not less than 160 nm and not more than 700 nm. The scintillator preferably has an emission peak within the wavelength range of not less than 300 nm and not more than 500 nm. Examples of the ionizing radiation include X-ray, γ-ray, α-ray, and neutron ray.

Upon irradiation of the scintillator with γ-ray, the fluorescence intensity 100 ns after the time when the fluorescence intensity reaches the maximum value is not limited. It is usually not more than 5%, preferably not more than 2%, more preferably not more than 1.5%, still more preferably not more than 1% with respect to the maximum value of fluorescence intensity, which is taken as 100%. There is no lower limit, and the fluorescence intensity is usually not less than 0%. Thus, a scintillator material that contributes to radiation inspection with high time resolution can be provided by the achievement of a very quick fluorescence decay and a sufficiently low fluorescence intensity after a predetermined length of time.

The fluorescence intensity may be measured by the method described in the Examples below.

The form of the scintillator is not limited, and may be appropriately selected in accordance with various uses and purposes. For example, the scintillator may be in the form of any of a powder, single crystal, polycrystal, and sintered body, especially in the form of any of a powder, single crystal, and sintered body. For example, in cases where the scintillator is used for a PET device, the scintillator does not necessarily need to be in the form of a powder, and it is preferably a single crystal, or a block of a sintered body. In cases where the scintillator is used for an X-ray CT apparatus, the scintillator is preferably a single crystal, or a block of a sintered body, especially preferably a block of a sintered body. In cases where the scintillator is used for an X-ray detection film for a nondestructive test, the scintillator is preferably used as a film prepared by dispersing the powder in a resin sheet.

In cases where the scintillator is used in the form of a block, its shape is not limited. The block preferably has a radiation incidence surface and an emitting surface, and a certain height is preferably present between the radiation incidence surface and the emitting surface. The radiation incidence surface and the emitting surface are preferably in parallel.

The shape of the block is preferably a columnar shape, flat plate shape, or curved plate shape.

The height of the block shape is usually not less than 0.5 mm, preferably not less than 1 mm, more preferably not less than 3 mm, still more preferably not less than 5 mm, especially preferably not less than 10 mm, still especially preferably not less than 15 mm. There is no upper limit of the height, and the height may be appropriately set in accordance with the apparatus, device, or the like that utilizes the scintillator. The height is usually not more than 100 mm. The "height" in the flat plate shape or curved plate shape means the thickness.

<Method of Producing Scintillator>

The method of producing the scintillator (also referred to as the "present production method") is not limited. Examples of the method include a method comprising:

a raw material mixing step of weighing and sufficiently mixing raw materials such that a composition of interest is obtained, to obtain a raw material mixture; and a synthesis step of filling the obtained raw material mixture into a heat-resistant container and subjecting the raw material mixture to heat treatment at a predetermined temperature in a predetermined atmosphere, to obtain a synthetic powder;

the method preferably further comprising:

a pressure molding step of pressure-molding the obtained synthetic powder, to obtain a pressure-molded body; and a firing step of firing the obtained pressure-molded body at a predetermined temperature in a predetermined atmosphere, and, when necessary, processing and washing the fired product, to obtain a sintered body. An example of the method of producing a scintillator is described below.

[Raw Material Providing Step]

The method of producing a scintillator may comprise a step of providing raw materials (raw material providing step). The raw materials used are not limited as long as the scintillator described above can be produced. For example, an oxide, a halide, an inorganic acid salt, and/or the like of each constituting atom may be used.

Concerning Hf, for example, $HfO_2$ may be used as a raw material, and the purity of $HfO_2$ in the raw material is usually not more than 99.999 mol %, preferably not more than 99.9 mol %, more preferably not more than 99.0 mol %, and is usually not less than 90 mol %. In cases where the purity is too high, sintering does not proceed, leading to low light-transmittance in some cases. In cases where the purity is too low, the luminescence decay time is long, which is not preferred. By using $HfO_2$ having the purity described above, a less expensive raw material can be used, so that the scintillator can be produced inexpensively.

Concerning Ba, for example, $BaCO_3$ may be used, and the purity of the $BaCO_3$ is usually not less than 90 mol %, preferably not less than 99 mol %. There is not upper limit of the purity.

Concerning Ca, for example, $CaCO_3$ may be used, and the purity of the $CaCO_3$ is usually not less than 90 mol %, preferably not less than 99 mol %. There is not upper limit of the purity.

Concerning Sr, for example, $SrCO_3$ may be used, and the purity of the $SrCO_3$ is usually not less than 90 mol %, preferably not less than 99 mol %. There is not upper limit of the purity.

Concerning Ce, for example, $CeO_2$, $CeI_3$, $Ce_2O_3$, $Ce(NO_3)_3$, and/or the like may be used, and the purity of the raw material is usually not less than 90 mol %, preferably not less than 99 mol %. There is not upper limit of the purity.

Concerning Zr, Zr contained in a small amount as an impurity in a raw material such as $HfO_2$ may be used as it is, or a Zr compound may be separately added. The Zr compound is not limited, and $ZrO_2$, $Zr_2O_3$, and/or the like may be used. The Zr content in the $HfO_2$ is not limited. It is usually not less than 100 ppm by mass, preferably not less than 500 ppm by mass, more preferably not less than 1000 ppm by mass, still more preferably not less than 1500 ppm by mass, and is not more than 10% by mass, may be not more than 50,000 ppm by mass, may be not more than 30,000 ppm by mass, may be not more than 21,000 ppm by mass, may be not more than 18,000 ppm by mass, or may be not more than 10,000 ppm by mass. In cases where Zr contained as an impurity in a raw material is used, the Zr content tends to decrease as the purity of the raw material increases. However, the purity of the raw material is not completely linked to the Zr contained as an impurity, and the content may vary depending on the type of the raw material and the production process. For example, in some cases, the purity is high, and the content of Zr contained as an impurity is low. In other cases, the purity is high, and the content of Zr contained as an impurity is high.

Concerning Al, for example, $Al_2O_3$ may be used, and the purity of the $Al_2O_3$ is usually not less than 90 mol %, preferably not less than 99 mol %. There is not upper limit of the purity. Al may be contained in a small amount as an impurity in each raw material other than the Al (or the Al compound). Since the Al content in each raw material (excluding the Al or Al compound) is usually from not more than 1 ppm by mass to about several ten ppm by mass, the amount of Al contained in the raw material mixture after the mixing of the raw materials can be kept sufficiently low by selecting appropriate raw materials.

Concerning Mg, for example, $3MgCO_3 \cdot Mg(OH)_2 \cdot 3H_2O$ may be used, and the purity of the $3MgCO_3 \cdot Mg(OH)_2 \cdot 3H_2O$ is usually not less than 90 mol %, preferably not less than 99 mol %. There is not upper limit of the purity. Mg may be contained in a small amount as an impurity in each raw material other than the Mg (or the Mg compound). The Mg content in each raw material (excluding the Mg or Mg compound) is usually from not more than 1 ppm by mass to about several ppm by mass. The amount of Mg contained in the raw material mixture after the mixing of the raw materials can be kept sufficiently low by selecting appropriate raw materials.

[Raw Material Mixing Step]

The present production method may comprise a step of mixing raw materials to obtain a raw material mixture (raw material mixing step). The method of mixing the raw materials is not limited, and methods commonly used may be applied. Examples of the method include the dry blending method and the wet blending method.

Examples of the dry blending method include blending using a ball mill or the like.

Examples of the wet blending method include a method in which a solvent or dispersion medium such as water is added to the raw materials, and the resulting mixture is mixed using a mortar and a pestle to prepare a mixture in the form of a dispersion or slurry, followed by drying the mixture by spray drying, heat drying, natural drying, or the like.

[Synthesis Step]

The present production method may comprise a step of subjecting the raw material mixture to heat treatment to obtain a synthetic powder (synthesis step). By filling the raw material mixture into a heat-resistant container such as a crucible or tray, and subjecting the raw material mixture to heat treatment, a synthetic powder can be obtained. The material of the heat-resistant container is not limited as long as the material has low reactivity with each raw material. Examples of the container include platinum-based containers such as Pt-, Pt/Rh-, or Ir-based containers. The atmosphere during the heat treatment is not limited, and examples of the atmosphere include reducing atmospheres such as a hydrogen atmosphere and a hydrogen-rare gas mixed atmosphere; and an air atmosphere. In cases where the heat treatment is carried out in a reducing atmosphere, a container such as a Mo- or W-based container may be used as well as a platinum-based container.

The temperature and the time of the heat treatment are not limited as long as the scintillator can be obtained. The temperature and the time are preferably those which allow sufficient reaction of the raw materials mixed. The heat treatment temperature is usually not less than 900° C., preferably not less than 1000° C., and is usually not more than 2000° C., preferably not more than 1800° C. The synthesis time is usually not less than 1 hour, preferably not less than 3 hours, and is usually not more than 50 hours.

The synthetic powder obtained by the present synthesis step may be used for obtaining a sintered body by the later-described pressure molding step, pre-firing step, firing step, and/or the like, or may be used as it is as a powder scintillator.

By confirming whether or not the composition of the synthetic powder satisfies a preferred range before obtaining the sintered body by the later-described steps, the composition of the sintered body can be more securely adjusted to within a preferred range.

The synthetic powder obtained by the present synthesis step may be subjected to sieving. The mesh size (opening) of the sieve is usually not more than 500 μm, preferably not more than 200 μm. By the sieving, aggregation of the powder can be eliminated to obtain a scintillator having a uniform quality.

[Pressure Molding Step]

The present production method may comprise a step of pressure-molding the synthetic powder obtained in the synthesis step, to obtain a pressure-molded body (pressure molding step). The method and conditions of the pressure molding are not limited. The pressure molding may be carried out by, for example, uniaxial pressing or cold isostatic pressing. The pressure during the pressure molding is, for example, not less than 10 MPa, or may be preferably not less than 30 MPa. By appropriately carrying out the pressure molding, the voids after the sintering can be reduced, and the light-transmittance can hence be improved.

[Pre-Firing Step]

The present production method may comprise a step of pre-firing the synthetic powder obtained by the synthesis step or the pressure-molded body obtained by the pressure molding step, to obtain a pre-fired product (pre-firing step). The temperature, pressure, time, and atmosphere in the pre-firing are not limited as long as the scintillator can be obtained. The pre-firing temperature is usually not less than 1200° C., preferably not less than 1300° C., and is usually not more than 2000° C., preferably not more than 1800° C. The pre-firing pressure is usually not less than $10^{-5}$ Pa, preferably not less than $10^{-3}$ Pa, and is usually not more than 10 MPa, preferably not more than 2 MPa. The pre-firing time is usually not less than 1 hour, preferably not less than 2 hours, and is usually not more than 50 hours. The atmosphere is preferably an inert atmosphere such as an argon atmosphere or a nitrogen atmosphere.

[Firing Step]

The present production method may comprise a step of further heating (firing) the synthetic powder obtained by the synthesis step, the pressure-molded body obtained by the pressure molding step, or the pre-fired product obtained by the pre-firing step, under pressure to obtain a fired product (sintered body) (firing step). The method and conditions of the pressurization are not limited. The pressurization may be carried out by, for example, the hot isostatic pressing method (HIP). Before the firing, a hot press process may be introduced.

The conditions during the firing are not limited as long as the scintillator can be obtained. The firing temperature is usually not less than 1200° C., preferably not less than 1300° C., and is usually not more than 2000° C., preferably not more than 1800° C. The firing pressure is usually not less than 10 MPa, preferably not less than 50 MPa, and is usually not more than 300 MPa, preferably not more than 200 MPa. The firing time is usually not less than 0.5 hour, preferably not less than 1 hour, and is usually not more than 20 hours, preferably not more than 10 hours.

The atmosphere during the firing is not limited as long as the scintillator can be obtained. The firing is preferably carried out in an appropriate atmosphere taking into account the stability of the materials, reaction container, furnace material, and the like. Specific examples of the atmosphere include inert atmospheres such as an argon atmosphere and a nitrogen atmosphere.

The firing step may arbitrarily comprise, for example, a pretreatment step (a step of carrying out washing, drying, vacuum degassing, and/or the like), a post-treatment step (a step of carrying out washing, drying, and/or the like), or the like.

[Annealing Step]

In cases where the scintillator is obtained as a sintered body in the present production method, the fired product obtained by the firing step may be used as it is as the sintered body. Alternatively, the method may comprise a step of annealing the fired product (annealing step) for the purpose of repairing crystal defects after the firing step. By carrying out the annealing, the light absorption due to the crystal defects can be reduced, so that a sintered body having higher light-transmittance can be obtained.

Conditions in the annealing step, such as the temperature, pressure, time, and atmosphere are not limited as long as the scintillator can be obtained. The annealing temperature is usually not less than 1000° C., preferably not less than 1200° C., and is usually not more than 1500° C. The annealing pressure is usually not less than 10 MPa, preferably not less than 20 MPa, and is usually not more than 300 MPa, preferably not more than 200 MPa. The annealing time is usually not less than 0.5 hour, preferably not less than 1 hour, and is usually not more than 20 hours, preferably not more than 10 hours. The atmosphere is preferably an inert atmosphere such as an argon atmosphere or a nitrogen atmosphere.

[Single-Crystal Growing Step]

In cases where the scintillator is to be obtained as a single crystal, for example, the sintered body obtained by the firing step or the annealing step may be melted by heating to allow single-crystal growth from the melt, to prepare the single crystal. The container and the atmosphere for the preparation of the single crystal may be appropriately selected from the same point of view as in the production of the sintered body. The method of the single-crystal growth is not limited, and a common method such as the Czochralski method, Bridgman method, micro-pull-down method, EFG method, or zone melting method may be used. For the purpose of lowering the melting point, the flux method or the like may also be used. In cases where a large-sized crystal is to be grown, the Czochralski method or the Bridgman method is preferred.

The method of obtaining the scintillator as a powder is not limited. Examples of the method include a method in which the synthetic powder obtained by the synthesis step is provided as it is as a powder scintillator, a method in which the sintered body obtained by the firing step or the annealing step is pulverized, and a method in which the single crystal obtained by the single-crystal growing step is pulverized. The method of the pulverization is not limited.

<Use of Scintillator>

The use of the scintillator is not limited. The scintillator may preferably be used for a radiation detector. The radiation detector may be used in the fields of, for example, radiology, physics, physiology, chemistry, mineralogy, and also petroleum exploration, for the purposes of positron CT (PET) for medical diagnosis, cosmic-ray observation, underground resource exploration, and the like.

In cases of the use for a radiation detector, the form of the scintillator is not limited. The scintillator may be in the form of any of a powder, single crystal, and sintered body. The scintillator can be used as a radiation detector when it is combined with a photodetector. Examples of the photodetector used in the radiation detector include a position-sensitive photoelectron multiplier tube (PS-PMT), a silicon photomultiplier (Si-PM) photodiode (PD), or an avalanche photodiode (APD).

The radiation detector comprising the scintillator can be used also as a radiation inspection apparatus. Examples of the radiation inspection apparatus comprising the radiation detector include inspection apparatuses for nondestructive tests, such as a detector for nondestructive tests, a detector for resource exploration, or a detector for high-energy physics; and diagnostic devices such as a medical image processor. Examples of the medical image processor include positron emission tomography (PET) apparatuses, X-ray CT, and SPECT. Examples of the form of the PET include two-dimensional PET, three-dimensional PET, time-of-flight (TOF) PET, or depth-of-interaction (DOI) PET. These may also be used in combination.

EXAMPLES

The present invention is described below in more detail by way of Examples. However, the present invention is not limited to the following Examples.

Example 1

$BaCO_3$ (purity, 99.99 mol %), $CeO_2$ (purity, 99.99 mol %), and high-purity $HfO_2$ (purity, 99.7 mol %; containing Zr as an impurity; the Zr content in the $HfO_2$, 2800 ppm by mass) were provided, and mixed together such that the molar ratio among the elements in terms of Ba:Ce:Hf was 0.99: 0.01:1.00, to obtain a raw material mixture in a powder form. The obtained raw material mixture was subjected to heat treatment in an air atmosphere at 1150° C. for 12 hours to obtain a synthetic powder (powder scintillator).

The obtained synthetic powder was passed through a sieve having an opening of 106 μm, to provide a raw material of a sintered-body scintillator. The obtained raw material was subjected to uniaxial pressing at 40 MPa for 1 minute and cold isostatic pressing at 170 MPa for 1 minute, to obtain a pressure-molded body. The obtained pressure-molded body was retained at 1600° C. under nitrogen flow (1 L/min) for 6 hours to carry out pre-firing. Finally, firing was carried out in a nitrogen atmosphere by the hot isostatic pressing method (HIP) at a temperature of 1600° C. at a pressure of 100 MPa for 2 hours, to obtain a sintered-body scintillator A having a composition represented by the above General Formula (1) (Table 1).

Example 2

A sintered-body scintillator B having a composition represented by the above General Formula (1) (Table 1) was obtained in the same manner as in Example 1 except that low-purity $HfO_2$ (purity, 98 mol %; containing Zr as an impurity; the Zr content in the $HfO_2$, 4000 ppm by mass) was added instead of the high-purity $HfO_2$ (purity, 99.7 mol %; containing Zr as an impurity; the Zr content in the $HfO_2$, 2800 ppm by mass) so as to obtain a scintillator having the Zr content shown in Table 1 below.

Example 3

A sintered-body scintillator C having a composition represented by the above General Formula (1) (Table 1) was obtained in the same manner as in Example 1 except that low-purity $HfO_2$ (purity, 98.5 mol %; containing Zr as an impurity; the Zr content in the $HfO_2$, 1.8% by mass) was added instead of the high-purity $HfO_2$ (purity, 99.7 mol %; containing Zr as an impurity; the Zr content in the $HfO_2$, 2800 ppm by mass) so as to obtain a scintillator having the Zr content shown in Table 1 below.

Comparative Example 1

A sintered-body scintillator D (Table 1) was obtained in the same manner as in Example 1 except that another type of high-purity $HfO_2$ (manufactured by Kojundo Chemical Lab. Co., Ltd.; purity, 99.5 mol %; containing Zr as an impurity) was added instead of the high-purity $HfO_2$ (purity, 99.7 mol %; containing Zr as an impurity; the Zr content in the $HfO_2$, 2800 ppm by mass) so as to obtain a scintillator having the composition and the Zr content shown in Table 1 below.

<Total Element Analysis>

By glow-discharge mass spectrometry (GDMS), the contents of Ba, Hf, O, Ce, and Zr (on a mass basis) in the sintered-body scintillators A to D were measured using VG9000, manufactured by VG Elemental, according to the following measurement conditions. The contents (mass ratios) of Ba, Hf, O, and Ce were converted to molar ratios, and the molar ratio of each element was calculated such that Ba+Hf+Ce=2 was satisfied. The results are shown in Table 1.

(Measurement Conditions)

Discharge gas: high-purity argon (purity, 99.9999 mol %)

Discharge cell: Mega Cell

Discharge conditions: 0.8 to 1 kV, 1.6 to 2 mA

Detector: O, Y, Ba, Hf . . . Faraday cup

Other elements . . . Daly-multiplier

Integration time: Faraday cup . . . 160 msec×60 points×1 scan; Daly-multiplier . . . 200 msec×60 points×1 scan; the analyzed value was determined as the average for n=1 to 5.

<Light-Transmittance>

Using U-3310, manufactured by Hitachi High-Tech Science Corporation, the light-transmittance was evaluated for the sintered-body scintillators A to D. For the measurement, a sample of 8.3 mm (diameter)×1.6 mm (thickness) was fixed using a transparent tape on a black jig in which a pin hole having a diameter of 1 mm was formed, and the black jig to which the sample was fixed was adhered to an integrating sphere such that the pin hole was positioned at the center of the incident light of U-3310, to measure the linear transmittance. The influence of scattering was evaluated based on the transmittance at the center emission wavelength 800 nm. The influence of absorption was evaluated based on the transmittance at the center emission wavelength 390 nm. The measurement results in Examples 1 to 3 and Comparative Example 1 are shown in Table 1 and FIG. 1.

<Fluorescence Decay Time (DT)>

Figure 2:
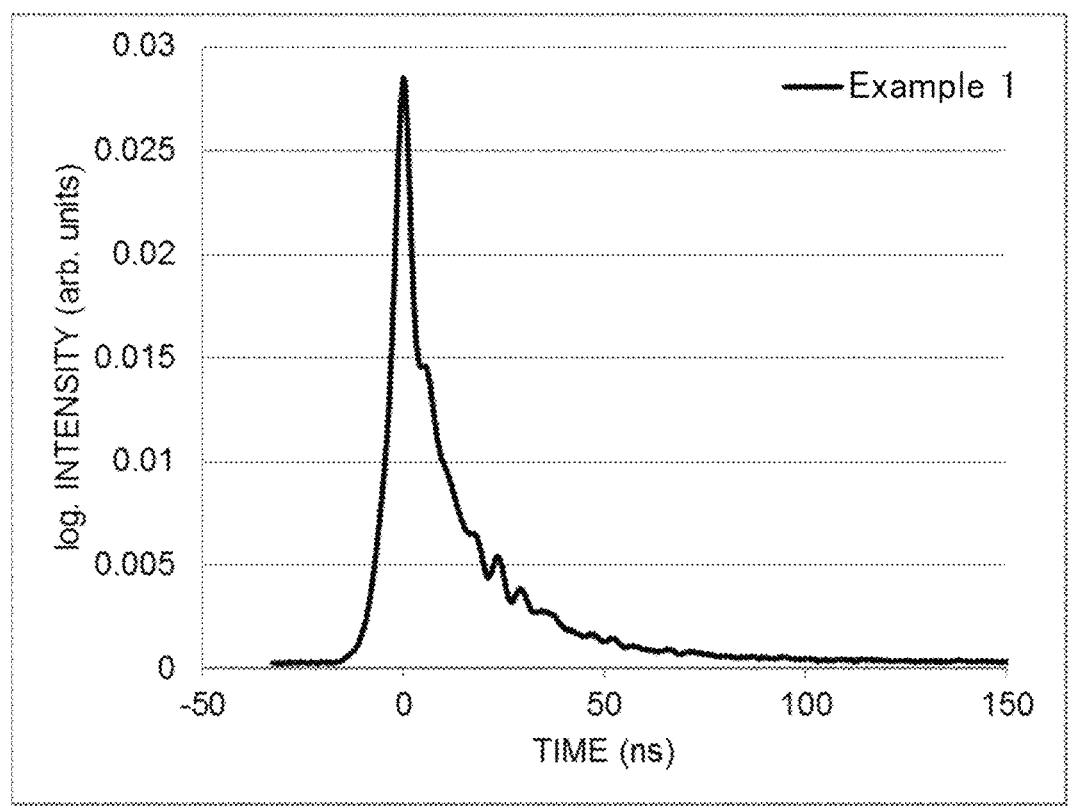
FIG. 2 is a diagram illustrating a fluorescence decay waveform of the scintillator of Example 1.
Figure 3:
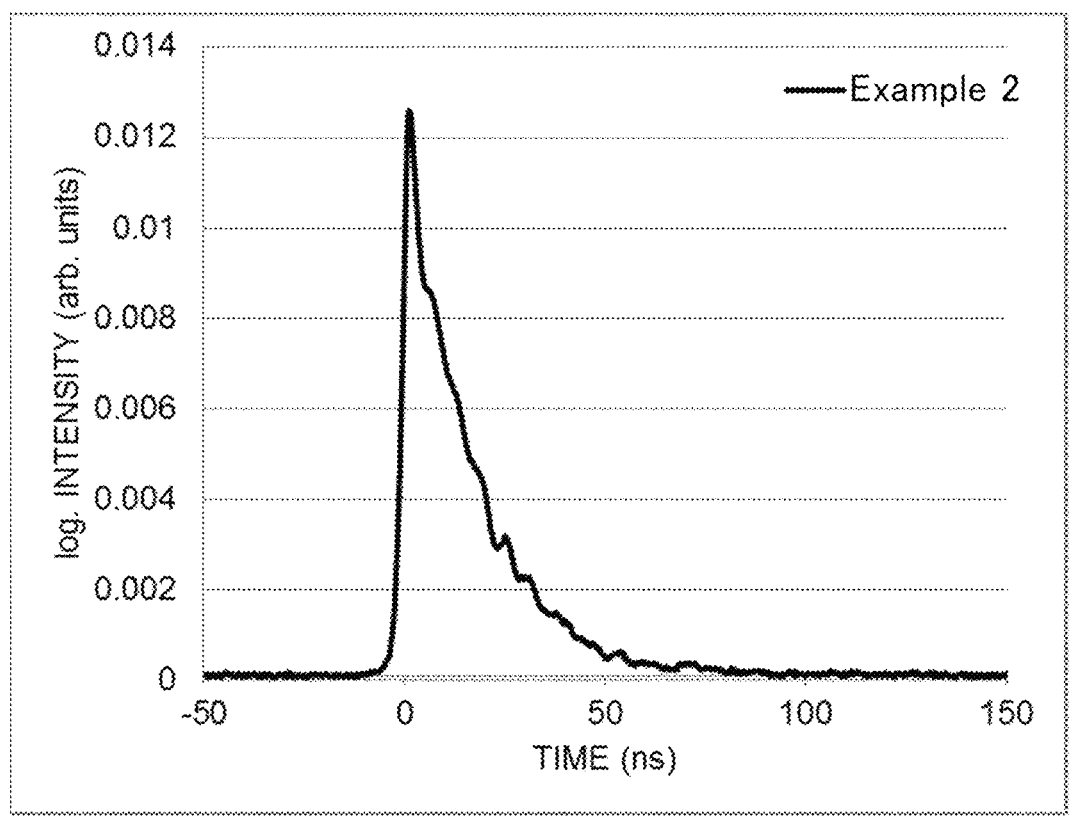
FIG. 3 is a diagram illustrating a fluorescence decay waveform of the scintillator of Example 2.
Figure 4:
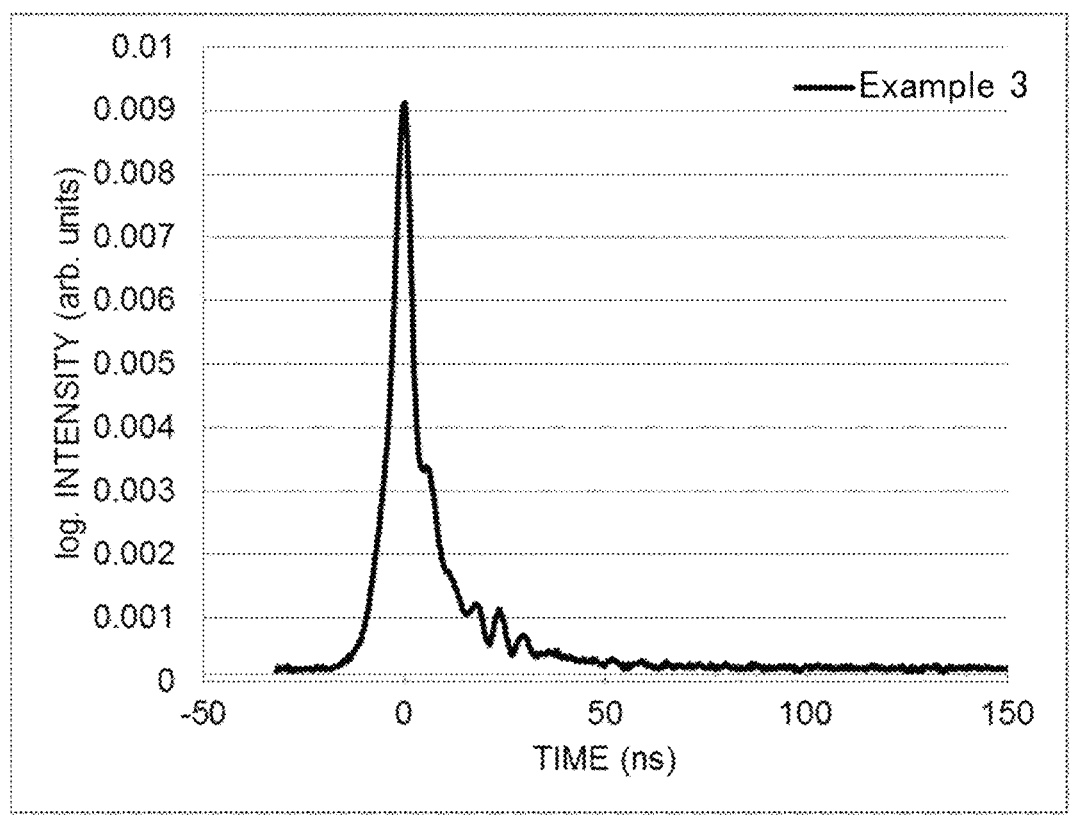
FIG. 4 is a diagram illustrating a fluorescence decay waveform of the scintillator of Example 3.

The fluorescence decay time (DT) was evaluated for the sintered-body scintillators A to D. A sample having a thickness of 1.6 mm was covered with a Teflon (registered trademark) tape, and then the sample was attached to an H7195 photoelectron multiplier tube manufactured by Hamamatsu Photonics K. K. using OPTSEAL, a silicone adhesive, manufactured by Shin-Etsu Chemical Co., Ltd. The sample was irradiated with γ-ray using Cs-137 as an excitation source, and the fluorescence intensity was measured during the γ-ray irradiation and after the irradiation, using an MSO54 5-BW-1000 oscilloscope manufactured by Tektronix, Inc. Based on the fluorescence intensities, fitting was carried out using a single exponential function, to calculate the fluorescence decay time (DT). The ratio of the fluorescence intensity 100 ns after the time when the fluorescence intensity reached the maximum value was calculated taking the maximum value of the fluorescence intensity as 100%. Table 1 shows measurement results in Examples 1 to 3 and Comparative Example 1, and FIGS. 2 to 4 show measurement results in Examples 1 to 3.

TABLE 1

| Example/Comparative Example | Molar ratio of each element in $Ba_xHf_yO_{3z}$:Ce | | | | Zr content (ppm by mass) |
|---|---|---|---|---|---|
| | Ba | Hf | O | Ce | |
| Comparative Example 1 | 1.1 | 0.9 | 3.4 | 0.011 | 1400 |
| Example 1 | 1.2 | 0.8 | 3.9 | 0.016 | 2700 |
| Example 2 | 1.2 | 0.8 | 3.6 | 0.017 | 4500 |
| Example 3 | 1.2 | 0.8 | 3.7 | 0.017 | 20000 |

TABLE 1-continued

| Example/Comparative Example | 800 nm Transmittance (%) | 390 nm Transmittance (%) | Fluorescence intensity at 100 ns (*) | Fluorescence decay time (DT) (ns) |
|---|---|---|---|---|
| Comparative Example 1 | 0.3 | 0.0 | Unmeasurable | Unmeasurable |
| Example 1 | 84 | 6.0 | 0.7 | 15 (±2) |
| Example 2 | 64 | 6.5 | 1.1 | 14 (±2) |
| Example 3 | 68 | 1.0 | 1.2 | 15 (±2) |

(*) The ratio (%) of the fluorescence intensity 100 ns after the time when the fluorescence intensity reached the maximum value, relative to the maximum value of the fluorescence intensity, which is taken as 100%.

As shown in Table 1 and FIG. 1, the scintillators of Examples had higher light-transmittance than the scintillator of the Comparative Example. Moreover, the scintillators of Examples had DTs of 14 to 15±2 ns, which are very short. Moreover, the ratio of the fluorescence intensity 100 ns after the time when the fluorescence intensity reached the maximum value was not more than 2% with respect to the maximum value of the fluorescence intensity, which is taken as 100%. Thus, the fluorescence intensity after the period of time following the radiation irradiation was low. Moreover, the above-described excellent properties were found even in the cases of Example 2 and 3, wherein an inexpensive low-purity $HfO_2$ with a purity of not more than 99.0% was used. The scintillator of the Comparative Example had very low linear transmittances in the wavelength ranges of 800 nm and 390 nm, and a very low luminescence intensity. Thus, the fluorescence intensities during the radiation irradiation and after the irradiation, and the fluorescence decay time, could not be measured.

As described above, the present invention can provide a scintillator which has a short fluorescence decay time, whose fluorescence intensity after a period of time following radiation irradiation is low, and which shows largely improved light-transmittance.

Further, the present invention can provide a scintillator which has a short fluorescence decay time, whose fluorescence intensity after a period of time following radiation irradiation is low, which shows largely improved light-transmittance, and which can be inexpensively produced.

What is claimed is:

1. A scintillator represented by the following General Formula (1), the scintillator comprising Zr, having a Zr content of not less than 1500 ppm by mass therein, and being a block of a sintered body,

$$Q_xM_yO_{3z}, \qquad (1)$$

wherein in General Formula (1), Q includes at least one or more kinds of divalent metallic elements; M includes at least Hf; and x, y, and z independently satisfy 0.5≤x≤1.5, 0.5≤y≤1.5, and 0.7≤z≤1.5, respectively.

2. The scintillator according to claim 1, wherein the Zr content is not more than 21,000 ppm by mass.

3. The scintillator according to claim 2, wherein the Zr content is not more than 5000 ppm by mass.

4. The scintillator according to claim 1, wherein the divalent metallic element(s) include(s) one or more kinds of elements selected from the group consisting of Ba, Sr, and Ca.

5. The scintillator according to claim 1, further comprising one or more kinds of elements selected from the group consisting of Ce, Pr, Nd, Eu, Tb, and Yb as an activator(s).

6. The scintillator according to claim 1, having a columnar shape, flat plate shape, or curved plate shape, and having a height of not less than 1 mm.

7. The scintillator according to claim 1, having a fluorescence decay time of not more than 30 ns.

8. The scintillator according to claim 1, having a fluorescence decay time of not more than 20 ns.

9. The scintillator according to claim 1, wherein the linear transmittance of light having a wavelength of 390 nm at a thickness of 1.6 mm is not less than 1%.

10. The scintillator according to claim 1, wherein the linear transmittance of light having a wavelength of 800 nm at a thickness of 1.6 mm is not less than 5%.

11. The scintillator according to claim 1, wherein, upon irradiation with γ-ray, the fluorescence intensity 100 ns after the time when the fluorescence intensity reaches the maximum value is not more than 2% with respect to the maximum value of fluorescence intensity, which is taken as 100%.

12. A radiation detector comprising the scintillator according to claim 1.

13. A radiation inspection apparatus comprising a radiation detector,
the radiation detector comprising the scintillator according to claim 1.

14. A method of producing a scintillator, the method comprising:
a raw material mixing step of mixing raw materials to obtain a raw material mixture; and
a synthesis step of subjecting the raw material mixture to heat treatment to obtain a synthetic powder;
the raw materials comprising at least HfO$_2$, having a purity of not more than 99.0 mol %,
the scintillator being a scintillator represented by the following General Formula (1), the scintillator comprising Zr, having a Zr content of not less than 1500 ppm by mass therein, and being a block of a sintered body, $$Q_xM_yO_{3z}, \qquad (1)$$

wherein in General Formula (1), Q includes at least one or more kinds of divalent metallic elements; M includes at least Hf; and x, y, and z independently satisfy 0.5≤x≤1.5, 0.5≤y≤1.5, and 0.7≤z≤1.5, respectively.

15. The method of producing a scintillator according to claim 14, wherein the Zr content in the HfO$_2$ is not less than 1500 ppm by mass.

16. The method of producing a scintillator according to claim 14, further comprising:
a pressure molding step of pressure-molding the synthetic powder to obtain a pressure-molded body; and
a firing step of firing the pressure-molded body to obtain a fired product.

17. The method of producing a scintillator according to claim 14, comprising:
a pressure molding step of pressure-molding the synthetic powder to obtain a pressure-molded body;
a firing step of firing the pressure-molded body to obtain a fired product; and
an annealing step of annealing the fired product after the firing step.

* * * * *

UNITED STATES PATENT AND TRADEMARK OFFICE
CERTIFICATE OF CORRECTION

PATENT NO. : 11,939,504 B2  
APPLICATION NO. : 17/847789  
DATED : March 26, 2024  
INVENTOR(S) : Koji Hazu et al.

Page 1 of 1

It is certified that error appears in the above-identified patent and that said Letters Patent is hereby corrected as shown below:

On the Title Page

Column 1, item (73) Assignee:  
"Mitsubishi Chemical Corporation, Tokyo (JP)"  
Should read:  
--Mitsubishi Chemical Corporation, Tokyo (JP);  
Tohoku University, Miyagi (JP)--

Signed and Sealed this  
Twenty-seventh Day of May, 2025

Coke Morgan Stewart  
*Acting Director of the United States Patent and Trademark Office*